(12) United States Patent
Zhang et al.

(10) Patent No.: US 10,628,655 B2
(45) Date of Patent: Apr. 21, 2020

(54) FINGERPRINT IDENTIFICATION APPARATUS

(71) Applicant: TPK Touch Solutions (Xiamen) Inc., Xiamen (CN)

(72) Inventors: Yu Zhang, Xiamen (CN); He-bo Yang, Xiamen (CN); Liang-Zhen Xu, Xiamen (CN); Chao Gao, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 262 days.

(21) Appl. No.: 15/610,551

(22) Filed: May 31, 2017

(65) Prior Publication Data

US 2017/0344785 A1 Nov. 30, 2017

(30) Foreign Application Priority Data

May 31, 2016 (CN) .......................... 2016 1 0375849

(51) Int. Cl.
*G06K 9/00* (2006.01)

(52) U.S. Cl.
CPC ....... *G06K 9/0004* (2013.01); *G06K 9/00046* (2013.01); *G06K 9/00053* (2013.01); *G06K 9/00087* (2013.01)

(58) Field of Classification Search
CPC ............ G06K 9/0004; G06K 9/00087; G06K 9/00053
See application file for complete search history.

(56) References Cited

U.S. PATENT DOCUMENTS

| 2016/0148031 | A1* | 5/2016 | Lin ..................... G06K 9/00053 382/124 |
| 2016/0224142 | A1* | 8/2016 | Yang ....................... G06F 3/041 |
| 2017/0011251 | A1* | 1/2017 | Wu ....................... G06K 9/0004 |
| 2017/0323144 | A1* | 11/2017 | Wu ....................... G06K 9/0004 |
| 2018/0025205 | A1* | 1/2018 | Wu ..................... G06K 9/00046 382/127 |

* cited by examiner

*Primary Examiner* — Wesley J Tucker
(74) *Attorney, Agent, or Firm* — Cooper Legal Group, LLC

(57) ABSTRACT

A fingerprint identification apparatus includes a cover plate, an optic fingerprint identification device, and an adhesive. The optic fingerprint identification device has a light-transmitting window. The adhesive is disposed between the cover plate and the optic fingerprint identification device, and a projection of the adhesive on the cover plate surrounds a projection of the light-transmitting window on the cover plate.

20 Claims, 6 Drawing Sheets

FINGERPRINT IDENTIFICATION APPARATUS

RELATED APPLICATIONS

This application claims priority to China Application Serial Number 201610375849.6, filed May 31, 2016, which is herein incorporated by reference.

BACKGROUND

Field of the Disclosure

The present invention relates to a fingerprint identification apparatus.

Description of Related Art

Since offering strict security and privacy protection, in recent years the fingerprint recognition technology has been increasingly applied to mobile devices, so as to prevent mobile devices from being used by unauthorized users. In particular, such mobile devices include a cover plate, a fingerprint reader and a touch display device. The touch display device is disposed at the central region of the inner surface of the cover plate, for receiving commands from users and displaying information. The fingerprint reader is disposed at the peripheral region of the inner surface of the cover, to recognize the user's fingerprint.

A common fingerprint reader recognizes fingerprint through principles of capacitive sensing. In order to effectively achieve the effect of fingerprint recognition, the distance between the fingerprint reader and the outer surface of the cover plate should be less than a certain distance. In other words, a part of the cover plate corresponding to the fingerprint reader has a thickness, which must be thin enough to enable the fingerprint reader to achieve the fingerprint recognition. However, if the thickness of this part of the cover plate is not substantive enough, the part may crack when being struck by an external force, and thereby causing damage to the cover plate. As a result, the capacitive fingerprint reader may be either high sensitivity or of good strength.

In current technology, an optical fingerprint reader may be adopted for replacing the capacitive fingerprint reader. The optical fingerprint reader senses several portions of fingers, such as the recessed and protruding portions of the fingerprint which reflect light of different properties, so as to achieve fingerprint recognition. As a result, when the optical fingerprint reader is bonded with the cover plate, the cover plate is not required to be very thin, which may solve the strength problem of the cover plate. An optical fingerprint reader is often bonded with the cover plate through a full layer of gel applied thereon. As a result of the bonding, the light emitted from the optical fingerprint reader and the light reflected by the fingers both pass through the gel, which may interfere with the light path and affect the accuracy and sensitivity of the fingerprint recognition.

SUMMARY

In the embodiments of the present invention, through the configuration of the optical fingerprint identification device, the problems of frequent damage of the cover plate due to lack of substantive thickness may be solved. In addition, the adhesive is disposed so as to not block the light-transmitting window of the optic fingerprint identification device, so that the structural strength and the positioning effect of the optic fingerprint identification device and the cover plate are respectively enhanced and improved without sacrificing the sensitivity of the fingerprint identification. Furthermore, through the wrap-around adhesive, the sealant using subsequently may be isolated from affecting the light and reducing the sensitivity of the fingerprint identification.

According to one aspect of the present invention, a fingerprint identification apparatus includes a cover plate, an optic fingerprint identification device, and an adhesive. The optic fingerprint identification device has a light-transmitting window. The adhesive is disposed between the cover plate and the optic fingerprint identification device, in which a projection of the adhesive on the cover plate surrounds a projection of the light-transmitting window on the cover plate.

In some embodiments of the present invention, the adhesive, the cover plate, and the optic fingerprint identification device form an enclosed space.

In some embodiments of the present invention, the optic fingerprint identification device includes a shell, a light-emitting unit, and a photo-sensor. A portion of the shell surrounds the light-transmitting window. The light-emitting unit is disposed in the shell and configured to emit light toward a target through the light-transmitting window and the cover plate. The photo-sensor is disposed in the shell and configured to sense the light reflected by the target.

In some embodiments of the present invention, the portion of the shell of the optic fingerprint identification device is a portion of the optic fingerprint identification device proximate to the cover plate, and the adhesive is disposed between the cover plate and the portion of the shell.

In some embodiments of the present invention, the fingerprint identification apparatus includes a selective light-transmitting layer, disposed between the optic fingerprint identification device and the cover plate. The light emitted from the light-emitting unit has a first wavelength range, and a transmittance of the selective light-transmitting layer in the first wavelength range is greater than a transmittance of the selective light-transmitting layer in a second wavelength range, which is out of the first wavelength range.

In some embodiments of the present invention, at least a portion of the selective light-transmitting layer is disposed between the adhesive and the cover plate.

In some embodiments of the present invention, the first wavelength range is an infrared wavelength range.

In some embodiments of the present invention, the first wavelength range is greater than 780 nanometers, the second wavelength range is of 380 nanometers to 780 nanometers, the transmittance of the selective light-transmitting layer in the first wavelength range is greater than 50%, and the transmittance of the selective light-transmitting layer in the second wavelength range is less than 20%.

In some embodiments of the present invention, the fingerprint identification apparatus further includes a shielding layer, disposed between the adhesive and the selective light-transmitting layer, wherein the shielding layer has an opening, and a projection of at least a portion of the light-transmitting window on the cover plate is present in a projection of the opening of the shielding layer on the cover plate.

In some embodiments of the present invention, a projection of the light-emitting unit on the cover plate is present in a projection of the shielding layer on the cover plate.

In some embodiments of the present invention, a projection of the adhesive on the cover plate is present in a projection of the shielding layer on the cover plate.

In some embodiments of the present invention, a transmittance of the shielding layer in a wavelength range of 380 nanometers to 900 nanometers is less than or equal to 10%.

In some embodiments of the present invention, the fingerprint identification apparatus further includes a sealant, connecting the optic fingerprint identification device and the cover plate, wherein the adhesive, the cover plate, and the shell of the optic fingerprint identification device form an enclosed space, and the sealant is not present in the enclosed space.

In some embodiments of the present invention, the cover plate comprises a recess, present at a surface of the cover plate opposite to a touch surface, and at least a portion of the optic fingerprint identification device is disposed in the recess.

In some embodiments of the present invention, a distance between the optic fingerprint identification device and a surface of the cover plate away from the optic fingerprint identification device is in a range of 0.3 millimeters to 2 millimeters.

In some embodiments of the present invention, the fingerprint identification apparatus further includes a decoration layer, disposed between the adhesive and the cover plate, wherein the decoration layer has an opening, and a projection of at least a portion of the light-transmitting window on the cover plate is present in a projection of the opening of the decoration layer on the cover plate.

In some embodiments of the present invention, the decoration layer defines a display area and a non-display area, the optic fingerprint identification device is disposed in the non-display area, and the fingerprint identification apparatus further comprising a display module, disposed in the display area.

In some embodiments of the present invention, the fingerprint identification apparatus further includes a selective light-transmitting layer, disposed on the cover plate and at least covering the opening of the decoration layer, wherein a portion of the selective light-transmitting layer on the optic fingerprint identification device covers the light-transmitting window of the optic fingerprint identification device.

DETAILED DESCRIPTION

Figure 1:
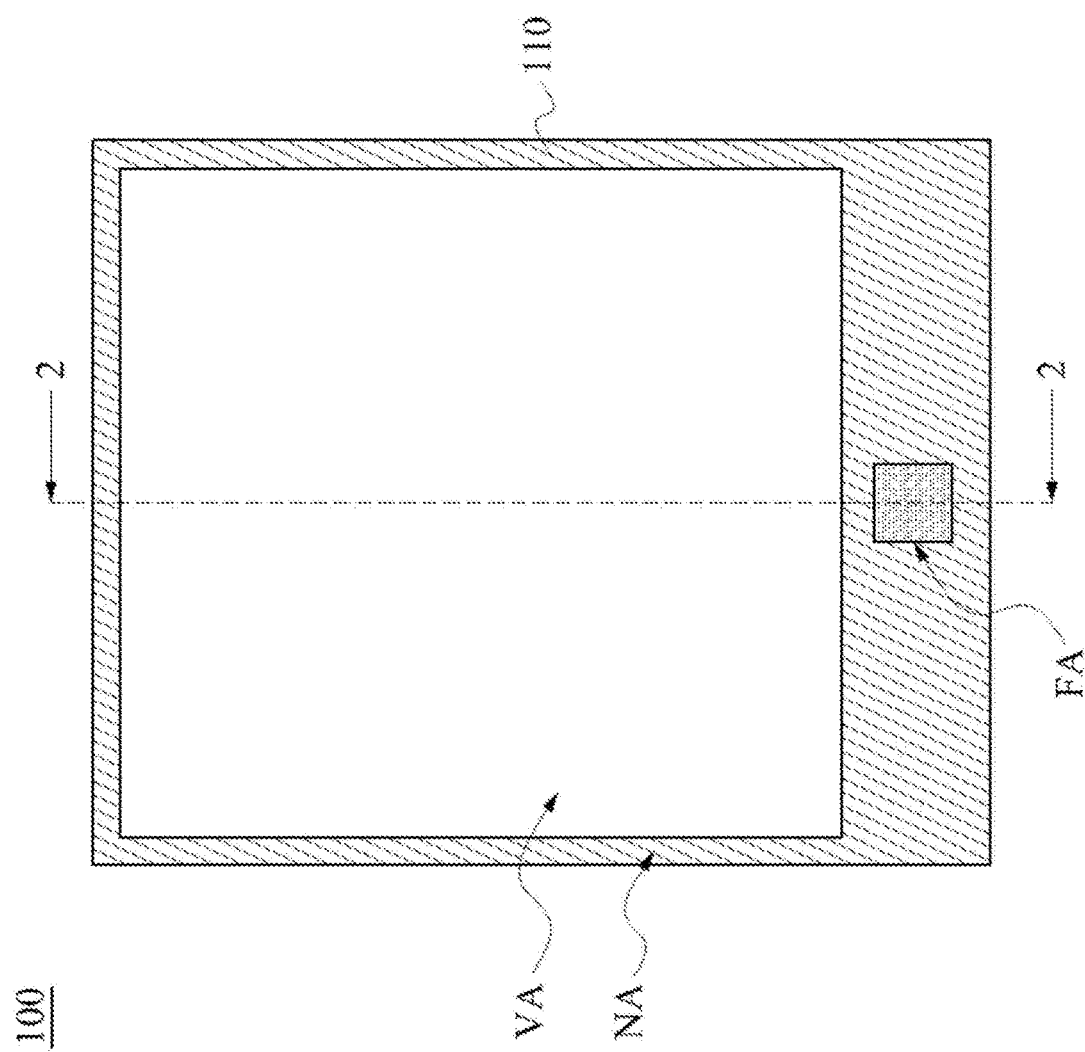
FIG. 1 is a top schematic view of a fingerprint identification apparatus according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a top schematic view of a fingerprint identification apparatus 100 according to an embodiment of the present invention. In some embodiments of the present invention, the fingerprint identification apparatus 100 may be a display panel, which may have a decoration layer 110 for defining a display area VA and a non-display area NA. The decoration layer 110 is positioned in the non-display area NA. The display area VA is configured to display information to users, while the non-display area NA is configured to shield opaque units such as peripheral electrical circuits of the display panel. Herein, the non-display area NA includes a fingerprint identification area FA, configured to sense a fingerprint of a touch finger. In some embodiments, the fingerprint identification apparatus 100 may be optionally mounted with a touch panel (not shown) for sensing the position(s) where the users touch, thereby receiving commands from the users.

Figure 2:
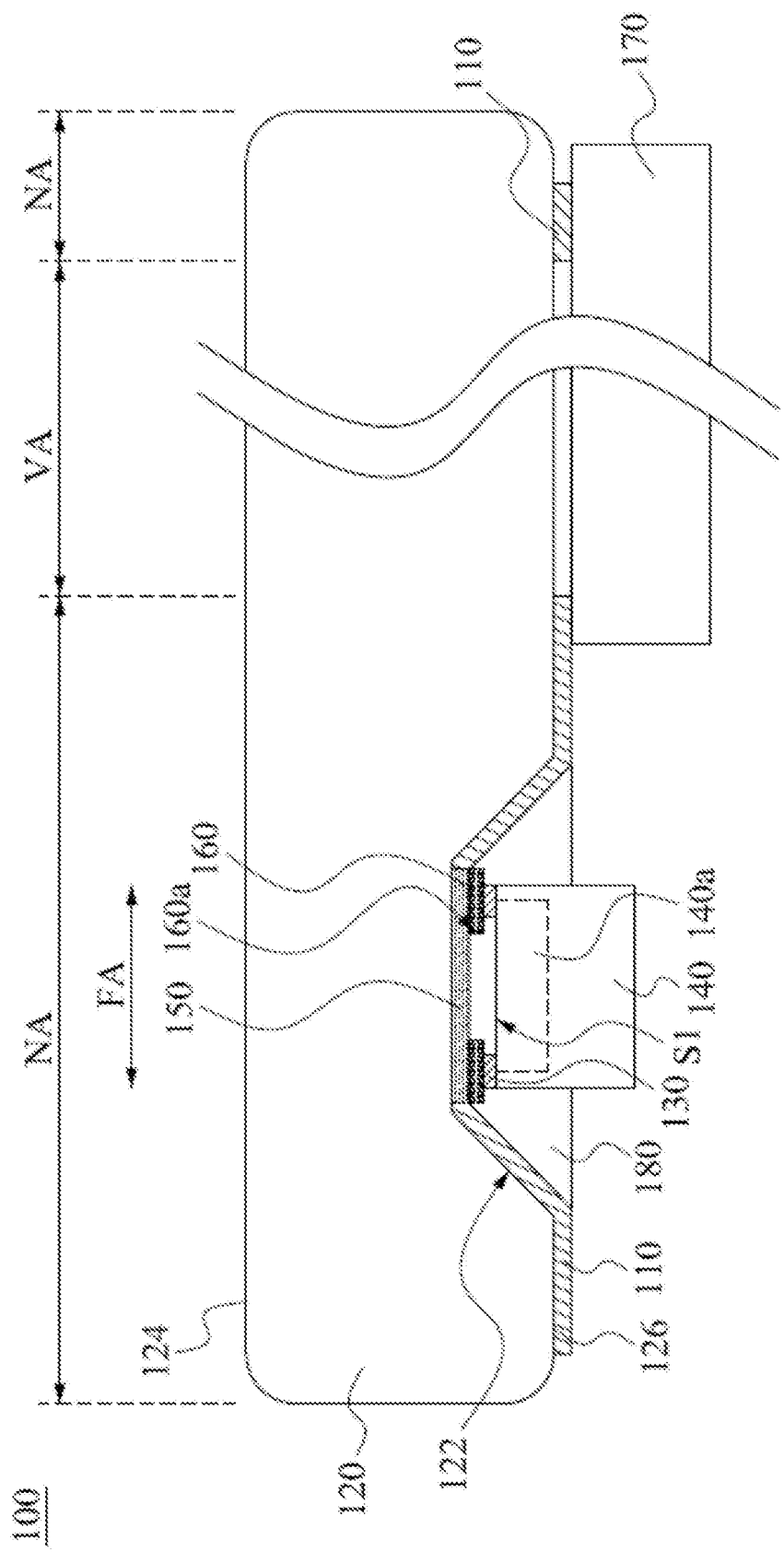
FIG. 2 is a cross-sectional schematic view along line 2-2 of FIG. 1.

FIG. 2 is a cross-sectional schematic view along line 2-2 of FIG. 1. Referring to FIG. 1 and FIG. 2, the fingerprint identification apparatus 100 includes a cover plate 120, an adhesive 130, and an optic fingerprint identification device 140. The optic fingerprint identification device 140 identifies fingerprints of the touch finger by detecting light reflected by respective positions of a touch finger. The optic fingerprint identification device 140 has a light-transmitting window 140a, which permits light emitted from the inner of the optic fingerprint identification device 140 to arrive at the touch finger and be reflected back to the inner of the optic fingerprint identification device 140. The optic fingerprint identification device 140 offers light of an appropriate wavelength range (which is referred to as a first wavelength range hereinafter). For example, the light may be infrared radiation.

Furthermore, in the present embodiments, the fingerprint identification apparatus 100 may further include a selective light-transmitting layer 150 and a shielding layer 160. The selective light-transmitting layer 150 and the shielding layer 160 may be formed on the cover plate 120 by ink-printing processes, and the specific positions are illustrated in the following. The selective light-transmitting layer 150 and the shielding layer 160 are capable of shielding undesired lights. For example, the undesired light may have a wavelength out of the first wavelength range, or it may be ambient light or light emitted by a light-emitting unit from the inner of the optic fingerprint identification device 140 but not used for fingerprint identification. Through the configuration, it is less easy to perceive the optic fingerprint identification device 140 for the users at a side of the cover plate, and thereby improving the visual appearance effect of the fingerprint identification area FA. In addition, the fingerprint identification apparatus 100 may further include a display module 170 corresponding to the display area VA for providing display information.

In some embodiments of the present invention, the cover plate 120 includes a touch surface 124 and a surface 126 opposite to the touch surface 124. The touch surface 124 acts as a contact surface, where fingers touch. The optic fingerprint identification device 140 is disposed at the surface 126 of the cover plate 120. The cover plate 120 includes a recess 122, formed at the surface 126, and at least a portion of the optic fingerprint identification device 140 is disposed in the recess 122. Of course, it should not limit the scope of the present invention, and in other embodiments, the cover plate 120 may not have a recess. As the configuration, the surface 126 of the cover plate 120 is a flat surface, and the optic fingerprint identification device 140 may be directly disposed on the flat surface 126 of the cover plate 120. The cover plate 120 may be formed from a transparent material, such as glass, plastics, or sapphires.

The selective light-transmitting layer 150 is disposed on the cover plate 120, covering the fingerprint identification area FA, and disposed between the optic fingerprint identification device 140 and the cover plate 120. The transmittance of the selective light-transmitting layer 150 in the first wavelength range is greater than a transmittance of the selective light-transmitting layer 150 in a second wavelength range, which is out of the first wavelength range. For example, the second wavelength range may be the range of ambient visible light, such as the range of about 380 nanometers to about 780 nanometers. Accordingly, the selective light-transmitting layer 150 transmits the light emitted from the optic fingerprint identification device 140, so that the light is transmitted to fingers and reflected back to the optic fingerprint identification device 140 by the fingers, and the selective light-transmitting layer 150 also blocks the ambient light of the second wavelength range from interfering the sensitivity of detection. In addition, the selective light-transmitting layer 150 prevents users at a side of the cover plate 120 from easily observing the optic fingerprint identification device 140, thereby enhancing the effect of visual appearance of the fingerprint identification area FA. In some embodiments of the present invention, the transmittance of the selective light-transmitting layer 150 in the second wavelength range (e.g. the range of about 380 nanometers to 780 nanometers) is less than about 20%, preferably less than about 10%, such as less than 5%. The transmittance of the selective light-transmitting layer 150 in the first wavelength range is greater than about 50%. It should be noted that, the transmittance of the selective light-transmitting layer 150 varies gradually in different wavelengths instead of varying sharply. For example, the aforementioned description of that the transmittance of the selective light-transmitting layer 150 in the first wavelength range (e.g. the wavelength range greater than about 780 nanometers) is greater than about 50% may be interpreted as that the transmittance of the selective light-transmitting layer 150 gradually varies from 20% to 50% in the wavelength range of 650 nanometers to 820 nanometers. Also, it may be interpreted as that the transmittance of the selective light-transmitting layer 150 is greater than about 50% at a wavelength greater than a wavelength range of 650 nanometers to 820 nanometers, such as the wavelength greater than 780 nanometers or 820 nanometers. Considering the transmittance of the selective light-transmitting layer 150, the thickness of the selective light-transmitting layer 150 is in a range of 0 to 50 micrometers, preferably 1 micrometer to 35 micrometers, more preferably 3 micrometers to 25 micrometers. For example, the selective light-transmitting layer 150 may be formed from infrared radiation ink, which transmits infrared radiation.

The shielding layer 160 is disposed on the selective light-transmitting layer 150 and between the adhesive 130 and the selective light-transmitting layer 150. The shielding layer 160 has an opening 160a disposed corresponding to the light-transmitting window 140a, and a projection of at least a portion of the light-transmitting window 140a on the cover plate 120 is positioned in a projection of the opening 160a of the shielding layer 160 on the cover plate 120. Accordingly, at least a portion of the light emitted from the optic fingerprint identification device 140 may pass through the light-transmitting window 140a, and then be transmitted to the target (the finger) through the opening 160a and the selective light-transmitting layer 150. Furthermore, a projected area of the opening 160a on the cover plate 120 is less than a projected area of the light-transmitting window 140a on the cover plate 120. Through the configuration, during the operation of the optic fingerprint identification device 140, the shielding layer 160 may block undesirable lights (e.g. the excess light generated by a light-emitting unit inside the optic fingerprint identification device 140) from being perceived by human eyes. The materials of the shielding layer 160 and the decoration layer 110 may the same or different. For example, the decoration layer 110 or the shielding layer 160 may be made of white ink, black ink, and so on.

The adhesive 130 is disposed between the cover plate 120 and the optic fingerprint identification device 140, so as to fix the optic fingerprint identification device 140 to the cover plate 120. A projection of the adhesive 130 on the cover plate 120 is present in the projection of the shielding layer 160 on the cover plate 120, so that the adhesive 130 does not fully block the light passing through the light-transmitting window 140a. For example, the projection of the adhesive 130 on the cover plate 120 surrounds the projection of the light-transmitting window 140a on the cover plate 120. Through the configuration, the adhesive 130 fixes the optic fingerprint identification device 140 to the cover plate 120 preliminary without fully blocking the light emitted from the optic fingerprint identification device 140 or reflected by the fingers. In some embodiments, the material of the adhesive 130 may be optical adhesive or double-sided adhesive, and the adhesive 130 may substantially be gel or solid when being disposed.

In some embodiments, when the projection of the adhesive 130 on the cover plate 120 surrounds the projection of the light-transmitting window 140a on the cover plate 120, the adhesive 130, the cover plate 120, the optic fingerprint identification device 140, the selective light-transmitting layer 150, and the shielding layer 160 form an enclosed space S1. Through the configuration, the space between the cover plate 120 and the optic fingerprint identification device 140 is prevented from being permeated by or staining with various materials using in subsequent fabrication processes or dust produced therefrom, so that the transmittance for the light applied in the fingerprint identification is prevented from being decreased.

Figure 3:
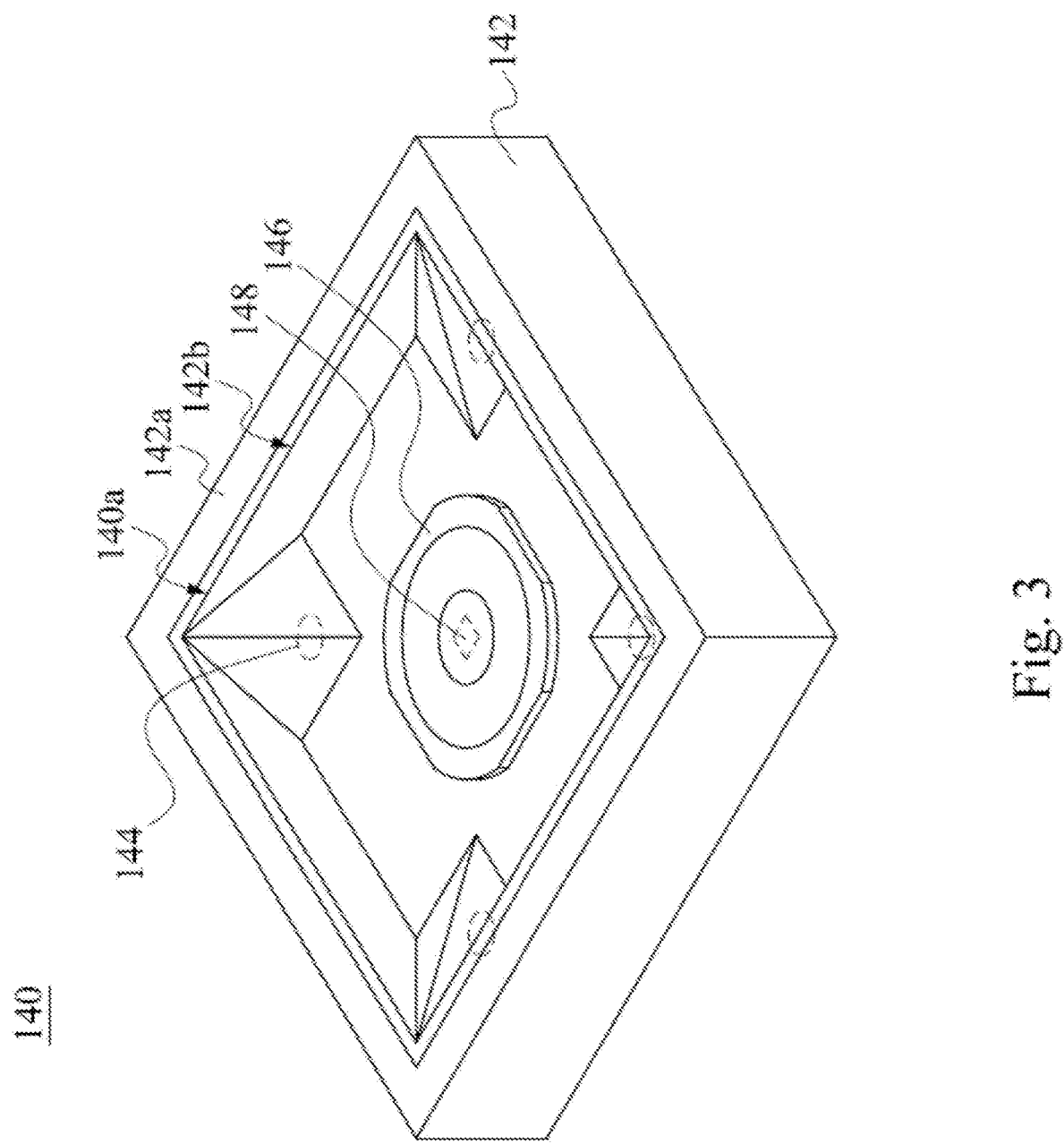
FIG. 3 is a perspective schematic view of an optic fingerprint identification device according to an embodiment of the present invention.

FIG. 3 is a perspective schematic view of the optic fingerprint identification device 140 according to an embodiment of the present invention. Referring to FIG. 2 and FIG. 3, the optic fingerprint identification device 140 includes a shell 142, a light-emitting unit 144, a light-focusing unit 146, and a photosensor 148. A portion 142a of the shell 142 surrounds the light-transmitting window 140a. For example, the portion 142a may be a wall plate. The light-emitting unit 144 is disposed in the shell 142 and configured to emit light toward the target (the fingers) through the light-transmitting window 140a and the cover plate 120. The light-focusing unit 146 is disposed in the shell 142 and configured to receive the light reflected by the target (the fingers) and collect the light to the photosensor 148. The photosensor 148 is disposed in the shell 142 and configured to sense the light reflected by the target (the fingers). For example, the photosensor 148 is disposed corresponding to a central position of the light-transmitting window 140a.

In some embodiments, the number of the light-emitting unit 144 may be plural, and the light-emitting units 144 are disposed at a peripheral region of the shell 142. Herein, light emitted from the light-emitting units 144 has the first wavelength range. For example, the first wavelength range is infrared wavelength range, such as the wavelengths greater than about 780 nanometers. To be specific, in an example of near-infrared radiation, the first wavelength range is of 780 to 2000 nanometers; in an example of middle-infrared radiation, the first wavelength range is of 3000 to 5000 nanometers; in an example of far-infrared radiation, the first wavelength range is of 8000 to 14000 nanometers. In some embodiments, the light-emitting units 144 may only emit infrared radiation. Of course, it should not limit the scope of the present invention, and in actual application, the light-emitting units 144 may emit both infrared radiation and visible light.

The light-focusing unit 146 may be a lens group, which is composed of plural convex lenses. The photosensor 148 may be various image sensors, such as charge coupled device (CCD) or complementary metal-oxide semiconductor (CMOS), and the photosensor 148 has a photoactive region covering at least the first wavelength range of the light-emitting units 144. It should be noted that the photosensor 148 is not limit to be positioned at the central region for directly receiving light reflected by the fingers through the light-focusing unit 146 (as shown in figure), but the photosensor 148 may be disposed at the peripheral region of the shell 142, and additional optical units may be adopted for directing lights to the photosensor 148.

In some embodiments of the present invention, the portion 142a of the shell 142 is a portion of the optic fingerprint identification device protruding from the optic fingerprint identification device 140. In other words, the portion 142a of the shell 142 of the optic fingerprint identification device 140 is a portion of the optic fingerprint identification device 140 proximate to the cover plate 120. Therefore, through the adhesive 130 disposed between the cover plate 120 and the portion 142a of the shell 142 proximate to the cover plate 120, the cover plate 120 may be attached to the optic fingerprint identification device 140 easily.

In some embodiments, the shell 142 may be made from material having suitable rigidity for supporting the structure of the optic fingerprint identification device 140. For example, the shell 142 may be made from metal, plastic, glass, etc. In the present embodiments, the portion 142a of the shell 142 surrounds and defines the opening 142b of the shell 142, and the opening 142b constitutes the light-transmitting window 140a. In other embodiments, the shell 142 may include various material, and the shell 142 may include transparent substrate (not shown) and the portion 142a formed by opaque material(s). The transparent substrate is proximate to the cover plate 120 and connected to the portion 142a of the shell 142, so as to form the light-transmitting window 140a.

In some embodiments, due to the adoption of the optic fingerprint identification device 140, a distance between the optic fingerprint identification device 140 and the touch surface 124 of the cover plate 120 away from the optic fingerprint identification device 140 has little influence on the fingerprint identification. Accordingly, the structural strength of the fingerprint identification apparatus 100 may be enhanced by increasing the thickness of the cover plate 120. For example, a thickness of the cover plate 120 may be greater than about 0.3 millimeters, in which a distance between a bottom surface of the recess 122 and the touch surface 124 (which is the thickness of the cover plate 120 at the position of the recess 122) may be greater than about 0.3 millimeters. Preferably, the distance between the optic fingerprint identification device 140 and the touch surface 124 of the cover plate 120 is in a range of 0.3 millimeters to 2 millimeters, such as 1 millimeter, 1.1 millimeters, or 1.5 millimeters. Through the configuration, despite the configuration of the recess 122, the structural strength of the fingerprint identification apparatus 100 does not decrease too much.

In some embodiments of the present invention, a projection of the light-emitting unit 144 on the cover plate 120 is present in the projection of the shielding layer 160 on the cover plate 120. Through the configuration, during the operation of the optic fingerprint identification device 140, the shielding layer 160 can shield glare that the light-emitting unit 144 may generate from being observed by human eyes. In some embodiments of the present invention, a transmittance of the shielding layer 160 in a wavelength range of 380 nanometers to 900 nanometers is less than or equal to 10%, preferably less than 5%.

In some embodiments of the present invention, the selective light-transmitting layer 150 is at least disposed between the adhesive 130 and the cover plate 120, so that the selective light-transmitting layer 150 may shield the adhesive 130, and light reflected by the adhesive 130 (such as interface reflection) may not be perceived by human eyes easily. Similarly, in some embodiments of the present invention, the projection of the adhesive 130 on the cover plate 120 is present in the projection of the shielding layer 160 on the cover plate 120. As the description about the selective light-transmitting layer 150, through the configuration, the shielding layer 160 may shield the adhesive 130, and light reflected by the adhesive 130 (such as interface reflection) may not be perceived by human eyes easily.

In some embodiments of the present invention, a width of the adhesive 130 is in a range of 0.1 millimeters to 3 millimeters, preferably 0.5 millimeters to 2 millimeters. A thickness of the adhesive 130 is in a range of 1 micrometer to 200 micrometers, preferably 10 micrometers to 80 micrometers. Through the configuration, the positioning effect and the sealing effect may be effectively achieved.

In some embodiments of the present invention, the display module 170 may be a liquid crystal module, an organic light-emitting diode display module, or other suitable configurations. In some embodiments, the fingerprint identification apparatus 100 may include touch module (not shown), disposed between the display module 170 and the cover plate 120, and the touch module acts as an input interface for users.

In some embodiments of the present invention, the fingerprint identification apparatus 100 further includes a sealant 180, connecting the optic fingerprint identification device 140 and the cover plate 120. Since the adhesive 130, the cover plate 120, the optic fingerprint identification device 140, the selective light-transmitting layer 150, and the shielding layer 160 form an enclosed space S1, the sealant 180 is prevented from permeating into the enclosed space, so that the transmittance of the space between the cover plate 120 and the light-transmitting window 140a is prevented from being decreased due to factors, such as absorption or interface reflection of the material. In some embodiments, the material of the sealant 180 may be water-resistant or moisture-resistant adhesive, which may substantially be liquid when being disposed and becomes solid through appropriate solidifying method in the subsequent processes.

In the present embodiments, the sealant 180 fills the recess 122 of the cover plate 120, so as to enhance the bonding strength of the optic fingerprint identification device 140 and the cover plate 120, and fix the optic fingerprint identification device 140 to the cover plate 120 more firmly. Herein, the sealant 180 exposes the bottom surface of the optic fingerprint identification device 140, but it should not limit the scope of the present invention. In other embodiments, the sealant 180 may cover the bottom surface of the optic fingerprint identification device 140 and prevented the optic fingerprint identification device 140 from being exposed. In still other embodiments, the cover plate 120 may not include the recess 122, which means the surface 126 of the cover plate 120 opposite to the touch surface 124 is a flat surface. The sealant 180 is attached to the flat surface 126 and the side surface of the optic fingerprint identification device 140, and may further cover the bottom surface of the optic fingerprint identification device 140.

It should be noted that, in the above embodiments, some units may be omitted, such as the decoration layer 110, the shielding layer 160, the selective light-transmitting layer 150, and the sealant 180, and the related embodiments are illustrated in the following.

Figure 4:
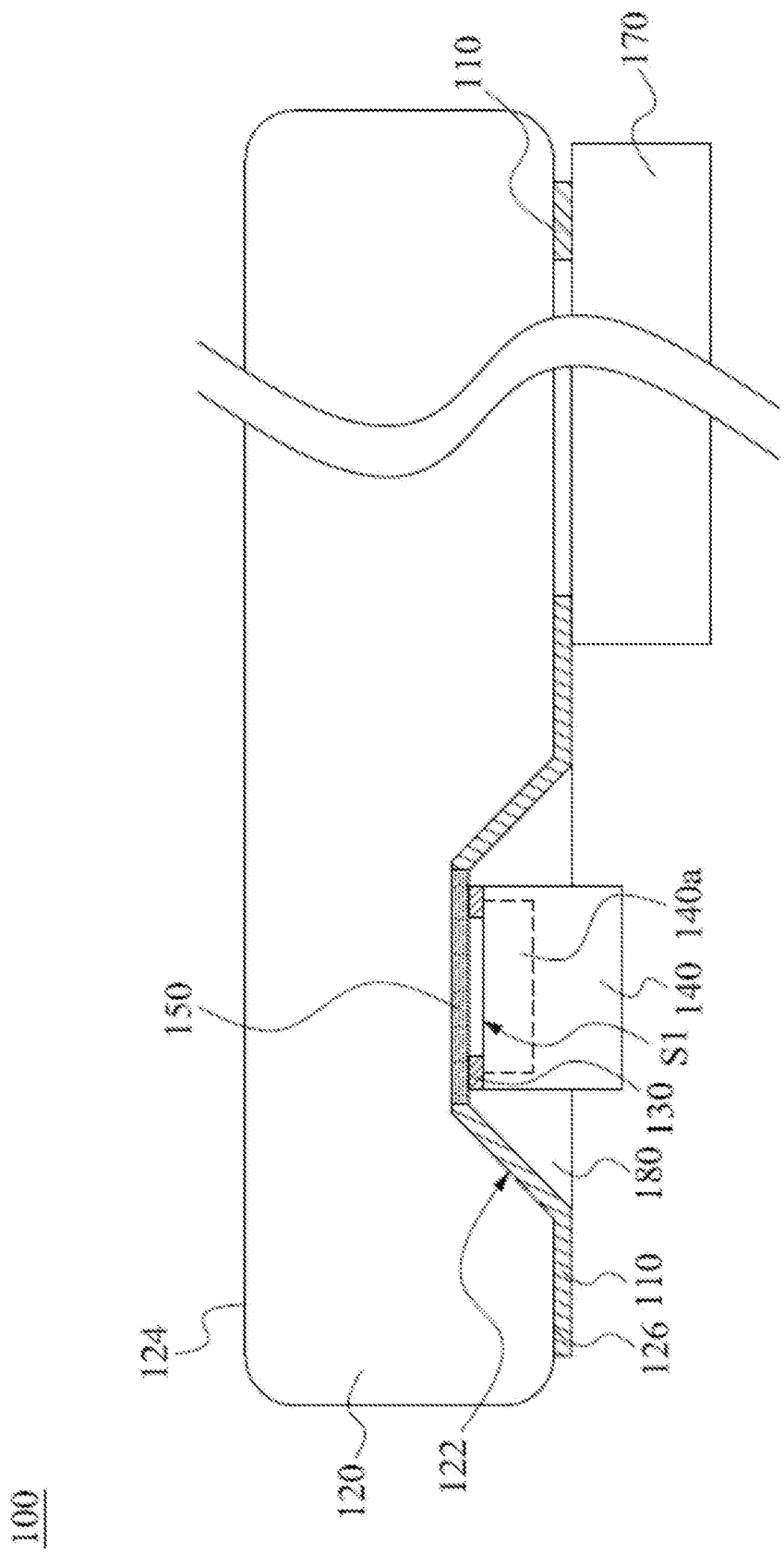
FIG. 4 is a cross-sectional schematic view of a fingerprint identification apparatus according to another embodiment of the present invention.

FIG. 4 is a cross-sectional schematic view of a fingerprint identification apparatus 100 according to another embodiment of the present invention. The present embodiments are similar to the embodiments of FIG. 2, and the difference there between lies in: the fingerprint identification apparatus 100 of the present embodiments does not include the shielding layer 160 (referring to FIG. 2).

In fact, the optic fingerprint identification device 140 may include an unit (not shown) capable of shielding the light-emitting units 144 (referring to FIG. 3) therein, such as a portion (not shown) of the shell 142 of the optic fingerprint identification device 140 (referring to FIG. 3), and therefore the glare may be prevented from interfering with visual effects without the configuration of the shielding layer 160 (referring to FIG. 2). Alternatively, light leaked from the light-emitting unit 144 (referring to FIG. 3) may be acceptable for users under some conditions. For example, the light emitted from the light-emitting unit 144 (referring to FIG. 3) does not include visible light. That is, the light-emitting unit 144 may only emit infrared radiation. As a result, the light does not interfere with visual effect.

In the present embodiments, the adhesive 130, the cover plate 120, the optic fingerprint identification device 140, and the selective light-transmitting layer 150 form an enclosed space S1. Through the configuration, the space between the cover plate 120 and the optic fingerprint identification device 140 (the light-transmitting window 140a) is prevented from being permeated by or staining with various materials using in subsequent fabrication processes or dusts produced therefrom, so that the transmittance for the light applied in the fingerprint identification is prevented from being decreased.

Other details of the present embodiments are substantially the same as those illustrated previously, and therefore omitted herein.

Figure 5:
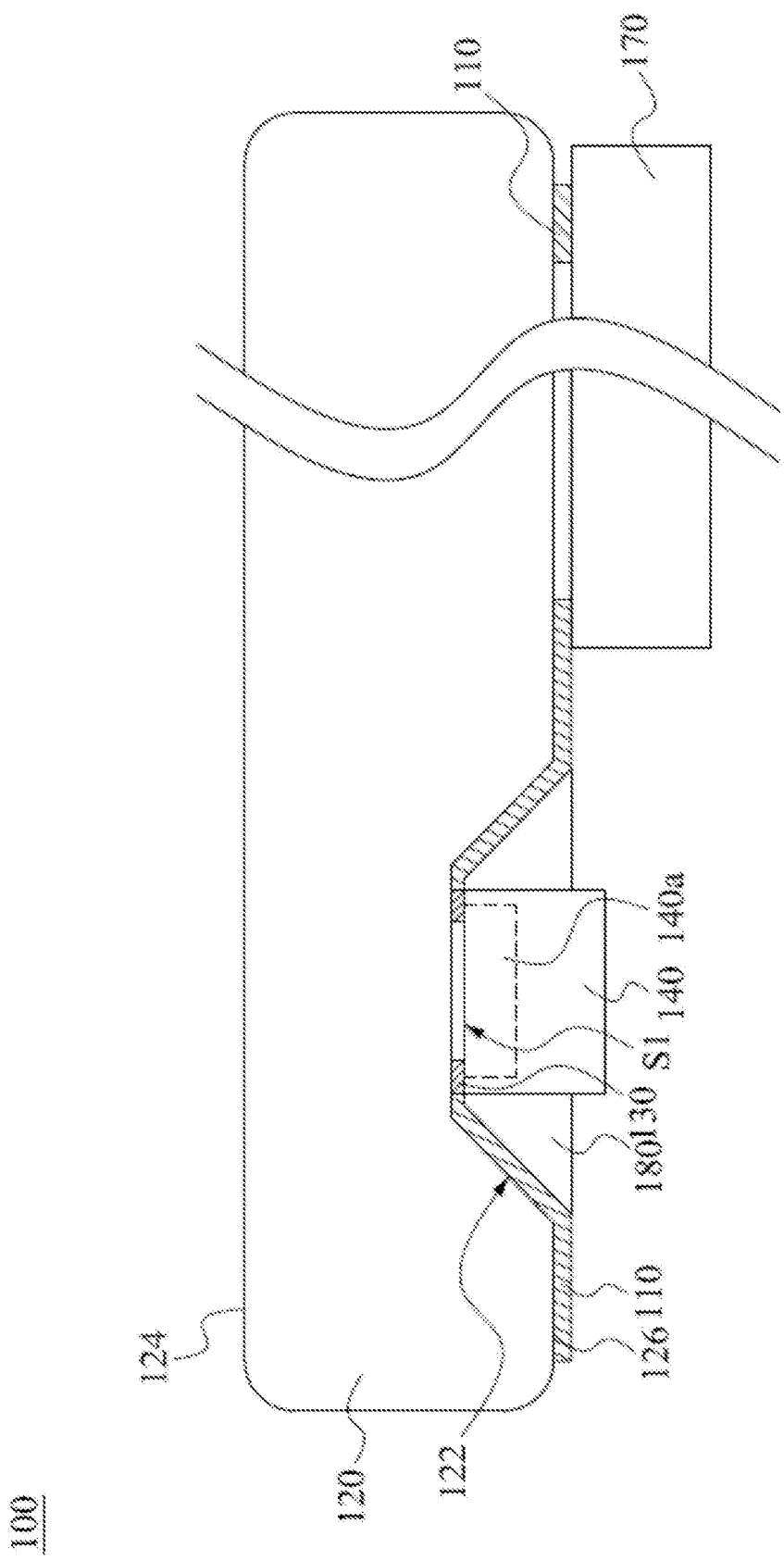
FIG. 5 is a cross-sectional schematic view of a fingerprint identification apparatus according to another embodiment of the present invention.

FIG. 5 is a cross-sectional schematic view of a fingerprint identification apparatus 100 according to another embodiment of the present invention. The present embodiments are similar to the embodiments of FIG. 4, and the difference therebetween lies in: the fingerprint identification apparatus 100 of the present embodiments does not include the selective light-transmitting layer 150 (referring to FIG. 2).

Under some conditions, it may be acceptable for users to perceive light emitted from the optic fingerprint identification device 140, and therefore it is not necessary to arrange the selective light-transmitting layer 150 to block ambient light.

Furthermore, in some embodiments, the optic fingerprint identification device 140 may include a filter having a passband corresponding to the first wavelength range, so that the photosensor 148 may only sense the light having the first wavelength range. Alternatively, the photosensor 148 itself may only sense the light having the first wavelength range and less affected by lights of other wavelengths. Accordingly, the sensitivity of detection does not decrease without the configuration of the selective light-transmitting layer 150.

In some embodiments, the adhesive 130 is disposed between the optic fingerprint identification device 140 and the cover plate 120, and the projection of the adhesive 130 on the cover plate 120 surrounds the projection of the light-transmitting window 140a on the cover plate 120. The adhesive 130 is disposed at the periphery of the optic fingerprint identification device 140, and the adhesive 130, the cover plate 120, and the optic fingerprint identification device 140 form an enclosed space S1. Through the configuration, the space between the cover plate 120 and the optic fingerprint identification device 140 (the light-transmitting window 140a) is prevented from being permeated by or staining with various materials using in subsequent fabrication processes or dusts produced therefrom, so that the transmittance for the light applied in the fingerprint identification is prevented from being decreased.

Other details of the present embodiments are substantially the same as those illustrated previously, and therefore omitted herein.

Figure 6:
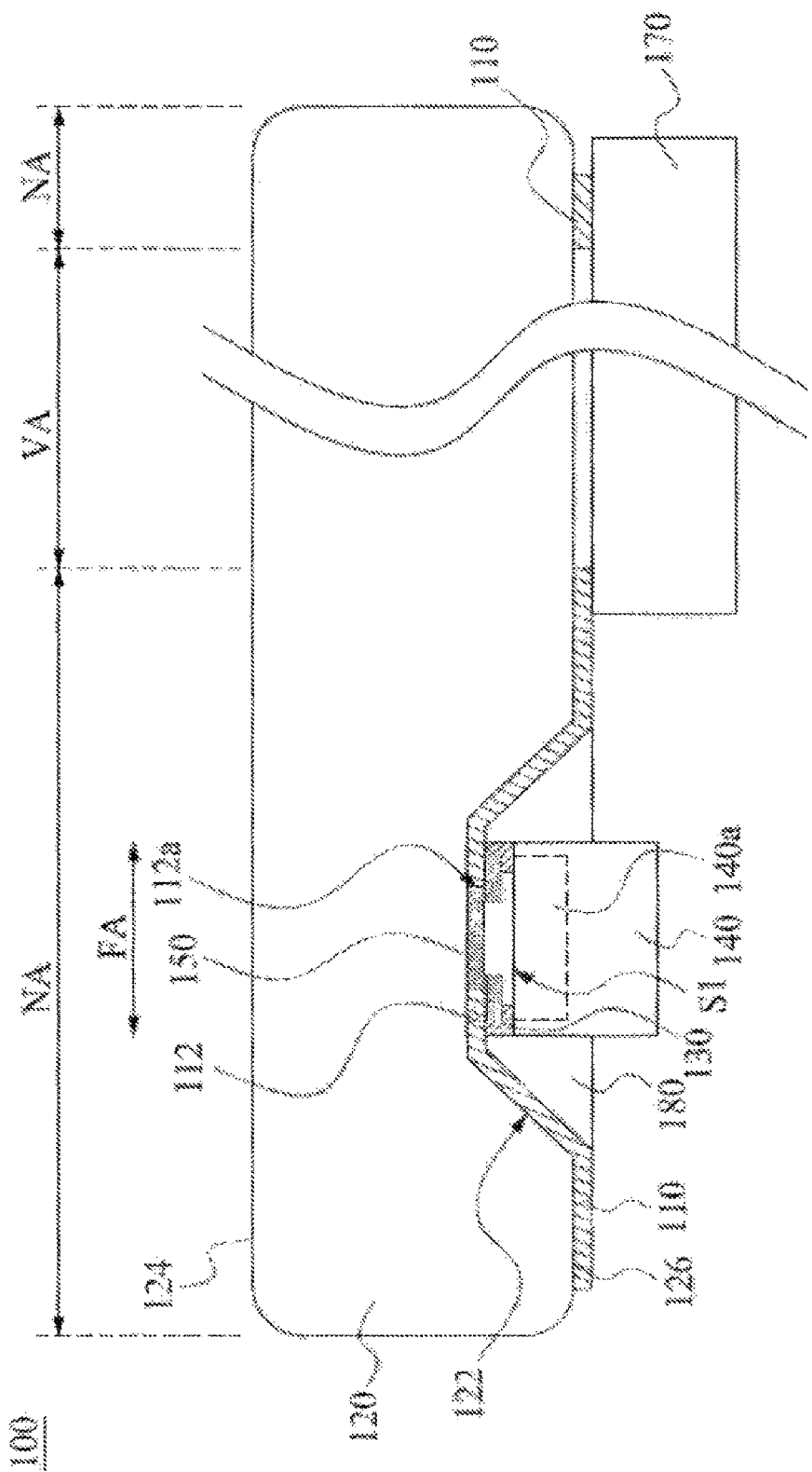
FIG. 6 is a cross-sectional schematic view of a fingerprint identification apparatus according to another embodiment of the present invention.

FIG. 6 is a cross-sectional schematic view of a fingerprint identification apparatus 100 according to another embodiment of the present invention. The present embodiments are similar to the embodiments of FIG. 2, and the difference therebetween lies in: at least a portion 112 of the decoration layer 110 of the present embodiments is disposed in the fingerprint identification area FA, so that the portion 112 may act as the shielding layer 160 (referring to FIG. 2) and realize the function of the shielding layer 160 (referring to FIG. 2), and the shielding layer 160 may be omitted. In other words, in the present embodiments, by extending the decoration layer 110 to the fingerprint identification area FA, the configuration of the decoration layer 110 and the shielding layer 160 (referring to FIG. 2) are integrated, thereby reducing the steps of fabrication process.

The portion 112 of the decoration layer 110 is disposed on the cover plate 120, and disposed between the adhesive 130 and the cover plate 120. The decoration layer 110 has an opening 112a disposed corresponding to the light-transmitting window 140a. A projection of at least a portion of the light-transmitting window 140a on the cover plate 120 is present in a projection of the opening 112a on the cover plate 120, so that at least a portion of the light emitted from the optic fingerprint identification device 140 may pass through the light-transmitting window 140a, and arrive at the target (the fingers) through the opening 112a. Furthermore, the projected area of the opening 112a on the cover plate 120 is less than the projected area of the light-transmitting window 140a on the cover plate 120. Through the configuration, during the operation of the optic fingerprint identification device 140, the decoration layer 110 may block undesirable lights (e.g. the excess light generated by a light-emitting unit inside the optic fingerprint identification device 140) from being perceived by human eyes.

In the present embodiments, during the fabrication process of the fingerprint identification apparatus 100, the decoration layer 110 is initially formed on the cover plate 120 for defining the display area VA and the non-display area NA, in which the decoration layer 110 is present in the non-display area NA. Then, the selective light-transmitting layer 150 is formed on the cover plate 120. To be specific, the selective light-transmitting layer 150 is present in the opening 112a of the decoration layer 110. Furthermore, the selective light-transmitting layer 150 at least covers the opening 112a of the decoration layer 110. After that, the optic fingerprint identification device 140 is bonded with the cover plate 120. Herein, the decoration layer 110 and the selective light-transmitting layer 150 are connected and even overlapped with each other, so as to effectively adjust the intensity of light according to the wavelengths. To be specific, the selective light-transmitting layer 150 may fully cover the light-transmitting window 140a and the opening 112a. Due to the process tolerances, the selective light-transmitting layer 150 may have a portion which may overlap with the portion 112 of the decoration layer 110. A projection of the selective light-transmitting layer 150 on the optic fingerprint identification device 140 covers the light-transmitting window 140a of the optic fingerprint identification device 140.

The adhesive is disposed between the portion 112 of the decoration layer 110 and the optic fingerprint identification device 140. The projection of the adhesive 130 on the cover plate 120 surrounds the projection of the light-transmitting window 140a on the cover plate 120. That is, the adhesive 130 is disposed at the periphery of the optic fingerprint identification device 140. Furthermore, the projection of the adhesive 130 on the cover plate 120 is present in the projection of the portion 112 of the decoration layer 110 on the cover plate 120, so that the adhesive 130 is shielded by the portion 112 of the decoration layer 110. The adhesive 130, the selective light-transmitting layer 150, and the optic fingerprint identification device 140 form an enclosed space S1. Through the configuration, the space between the cover plate 120 and the optic fingerprint identification device 140 (the light-transmitting window 140a) is prevented from being permeated by or staining with various materials using in subsequent fabrication processes or dust produced therefrom, so that the transmittance for the light applied in the fingerprint identification is prevented from being decreased. In addition, since the range where the adhesive 130 and the selective light-transmitting layer 150 may be disposed is limited, the adhesive 130 and the selective light-transmitting layer 150 are depicted as being connected. It should not limit the actual application, the adhesive 130 and the selective light-transmitting layer 150 may be disconnected.

Other details of the present embodiments are substantially the same as those illustrated previously, and therefore omitted herein.

The fingerprint identification apparatus of the present invention can be applied to not only display panel, but also various electronic products, such as smart phones, mobile phones, tablets, touch pads of notebooks, security systems, and access control system, which recognizes identity or performing other touch operation by fingerprint identification.

In some embodiments of the present invention, through the configuration of the optic fingerprint identification device, the problems of frequent damages of cover plate due to lack of thickness are solved. In addition, the adhesive is disposed without blocking the light-transmitting window of the optic fingerprint identification device, so that the structural strength and the positioning effect of the optic fingerprint identification device and the cover plate are respectively enhanced and improved without sacrificing the sensitivity of the fingerprint identification. Furthermore, through the wrap-around adhesive, the sealant using subsequently may be isolated and prevented from affecting the light and reducing the sensitivity of the fingerprint identification.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A fingerprint identification apparatus, comprising:
   a cover plate;
   an optic fingerprint identification device having a light-transmitting window; and
   an adhesive disposed between the cover plate and the optic fingerprint identification device, wherein:
      a projection of the adhesive on the cover plate surrounds a projection of the light-transmitting window on the cover plate, and
      an enclosed space is defined in part by a sidewall of the adhesive and a top surface of the optic fingerprint identification device.

2. The fingerprint identification apparatus of claim 1, wherein the optic fingerprint identification device comprises:
   a shell, wherein a portion of the shell surrounds the light-transmitting window;
   a light-emitting unit disposed in the shell and configured to emit light toward a target through the light-transmitting window and the cover plate; and
   a photosensor disposed in the shell and configured to sense the light reflected by the target.

3. The fingerprint identification apparatus of claim 2, wherein:
   the portion of the shell of the optic fingerprint identification device is proximate to the cover plate, and
   the adhesive is disposed between the cover plate and the portion of the shell.

4. The fingerprint identification apparatus of claim 2, further comprising:
   a selective light-transmitting layer disposed between the optic fingerprint identification device and the cover plate, wherein:
      the light emitted from the light-emitting unit has a first wavelength range,
      a transmittance of the selective light-transmitting layer in the first wavelength range is greater than a transmittance of the selective light-transmitting layer in a second wavelength range, and
      the second wavelength range is out of the first wavelength range.

5. The fingerprint identification apparatus of claim 4, wherein at least a portion of the selective light-transmitting layer is disposed between the adhesive and the cover plate.

6. The fingerprint identification apparatus of claim 4, wherein the first wavelength range is an infrared wavelength range.

7. The fingerprint identification apparatus of claim 4, wherein:
   the first wavelength range is greater than 780 nanometers,
   the second wavelength range is 380 nanometers to 780 nanometers,
   the transmittance of the selective light-transmitting layer in the first wavelength range is greater than 50%, and
   the transmittance of the selective light-transmitting layer in the second wavelength range is less than 20%.

8. The fingerprint identification apparatus of claim 4, further comprising:
a shielding layer disposed between the adhesive and the selective light-transmitting layer, wherein:
the enclosed space is further defined in part by the shielding layer, and
at least a portion of the projection of the light-transmitting window on the cover plate is present in a projection of the enclosed space on the cover plate.

9. The fingerprint identification apparatus of claim 8, wherein a projection of the light-emitting unit on the cover plate is present in a projection of the shielding layer on the cover plate.

10. The fingerprint identification apparatus of claim 8, wherein the projection of the adhesive on the cover plate is present in a projection of the shielding layer on the cover plate.

11. The fingerprint identification apparatus of claim 8, wherein a transmittance of the shielding layer in a wavelength range of 380 nanometers to 900 nanometers is less than or equal to 10%.

12. The fingerprint identification apparatus of claim 2, further comprising:
a sealant connecting the optic fingerprint identification device and the cover plate, wherein the enclosed space is spaced apart from the sealant by the adhesive.

13. The fingerprint identification apparatus of claim 1, wherein:
the cover plate comprises a recess present at a surface of the cover plate opposite to a touch surface, and
at least a portion of the optic fingerprint identification device is disposed in the recess.

14. The fingerprint identification apparatus of claim 1, wherein a distance between the optic fingerprint identification device and a surface of the cover plate away from the optic fingerprint identification device is in a range of 0.3 millimeters to 2 millimeters.

15. The fingerprint identification apparatus of claim 1, further comprising:
a decoration layer disposed between the adhesive and the cover plate, wherein:
the decoration layer defines an opening, and
at least a portion of the projection of at least a portion of the light-transmitting window on the cover plate is present in a projection of the opening of the decoration layer on the cover plate.

16. The fingerprint identification apparatus of claim 15, wherein:
the decoration layer defines a display area and a non-display area,
the optic fingerprint identification device is disposed in the non-display area, and
the fingerprint identification apparatus further comprises a display module disposed in the display area.

17. The fingerprint identification apparatus of claim 15, further comprising:
a selective light-transmitting layer disposed on the cover plate and at least covering the opening of the decoration layer, wherein a portion of the selective light-transmitting layer covers the light-transmitting window of the optic fingerprint identification device.

18. A fingerprint identification apparatus, comprising:
a cover plate;
an optic fingerprint identification device having a light-transmitting window, wherein the optic fingerprint identification device comprises:
a shell, wherein a portion of the shell surrounds the light-transmitting window;
a light-emitting unit disposed in the shell and configured to emit light toward a target through the light-transmitting window and the cover plate; and
a photosensor disposed in the shell and configured to sense the light reflected by the target;
an adhesive disposed between the cover plate and the optic fingerprint identification device, wherein a projection of the adhesive on the cover plate surrounds a projection of the light-transmitting window on the cover plate; and
a selective light-transmitting layer disposed between the optic fingerprint identification device and the cover plate, wherein:
the light emitted from the light-emitting unit has a first wavelength range,
a transmittance of the selective light-transmitting layer in the first wavelength range is greater than a transmittance of the selective light-transmitting layer in a second wavelength range, and
the second wavelength range is out of the first wavelength range.

19. A fingerprint identification apparatus, comprising:
a cover plate;
an optic fingerprint identification device having a light-transmitting window, wherein the optic fingerprint identification device comprises a light-emitting unit configured to emit light toward a target through the light-transmitting window and the cover plate;
an adhesive disposed between the cover plate and the optic fingerprint identification device, wherein a projection of the adhesive on the cover plate surrounds a projection of the light-transmitting window on the cover plate; and
a selective light-transmitting layer disposed between the optic fingerprint identification device and the cover plate, wherein:
the light emitted from the light-emitting unit has a first wavelength range,
a transmittance of the selective light-transmitting layer in the first wavelength range is greater than a transmittance of the selective light-transmitting layer in a second wavelength range, and
the second wavelength range is out of the first wavelength range.

20. The fingerprint identification apparatus of claim 19, wherein:
the first wavelength range is greater than 780 nanometers,
the second wavelength range is 380 nanometers to 780 nanometers,
the transmittance of the selective light-transmitting layer in the first wavelength range is greater than 50%, and
the transmittance of the selective light-transmitting layer in the second wavelength range is less than 20%.

* * * * *